United States Patent
Galvez et al.

(10) Patent No.: US 11,395,099 B2
(45) Date of Patent: Jul. 19, 2022

(54) SYSTEM AND METHOD FOR TRACKING LOCATIONS OF STUDENTS WITHIN SCHOOL BUILDINGS

(71) Applicant: Sensormatic Electronics, LLC, Boca Raton, FL (US)

(72) Inventors: Miguel Galvez, Plaistow, NH (US); Walter A. Martin, Ballymena (GB); Danny Hyun, Irvine, CA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/112,007

(22) Filed: Aug. 24, 2018

(65) Prior Publication Data

US 2020/0068351 A1 Feb. 27, 2020

(51) Int. Cl.
*H04W 4/029* (2018.01)
*G08B 27/00* (2006.01)
*H04W 4/33* (2018.01)

(52) U.S. Cl.
CPC .......... *H04W 4/029* (2018.02); *G08B 27/001* (2013.01); *H04W 4/33* (2018.02)

(58) Field of Classification Search
CPC ........... H04W 4/80; H04W 4/02; H04W 4/04; H04W 4/025; H04W 4/029; H04W 88/06;

(Continued)

(56) References Cited

U.S. PATENT DOCUMENTS 5,886,634 A 3/1999 Muhme
6,847,892 B2 1/2005 Zhou et al.
(Continued)

FOREIGN PATENT DOCUMENTS

CN 108597072 A * 9/2018

OTHER PUBLICATIONS

SkoolSmart Child Safety First, http://web.archive.org/web/20180221235126/http://www.skoolsmart.net/skoolsmart.html, pp. 1-6, Access on Feb. 21, 2018 (Year: 2018).*

(Continued)

*Primary Examiner* — Srilakshmi K Kumar
*Assistant Examiner* — Jing Gao
(74) *Attorney, Agent, or Firm* — ArentFox Schiff LLP

(57) ABSTRACT

A student tracking system deploys distributed sensors throughout a school building. The distributed sensors receive identification information broadcast by user devices carried by occupants of the school such as students, teachers and school administrators. The student tracking system tracks the location of the occupants within the building based on which sensors most recently detected the user devices. The system sends the location information for the occupants to tracking devices operated by tracking users such as school administrators, emergency responders and/or parents. The tracking devices also present to the parents image data captured by surveillance cameras depicting the students. Additionally, the distributed sensors detect the presence of unauthorized individuals within the school building by determining whether an individual detected via a proximity or motion detector corresponds to identification information for a registered user device received by the sensors.

30 Claims, 6 Drawing Sheets

(58) Field of Classification Search
CPC ....... H04W 4/021; H04W 4/043; H04W 4/30;
H04W 8/005; H04W 4/21; H04W 4/33;
H04W 4/38; H04W 52/0209; H04W
64/00; H04W 72/085; H04W 84/12;
H04W 12/12; H04W 40/244; H04W
52/245; H04W 76/40; H04W 48/04;
H04L 67/12; H04L 67/18; H04L 67/303;
H04L 67/2847; G06Q 30/0261; G06Q
30/0267; G06Q 20/3278; G06Q 50/22;
G06Q 50/01; G06N 5/022
See application file for complete search history.

(56) References Cited

U.S. PATENT DOCUMENTS

| | | | |
|---|---|---|---|
| 9,195,866 B1 | 11/2015 | Mehranfar et al. | |
| 9,400,902 B2 | 7/2016 | Schoner et al. | |
| 9,977,935 B1 | 5/2018 | Laranang et al. | |
| 9,980,112 B1* | 5/2018 | Newby | H04W 4/90 |
| 2005/0258937 A1 | 11/2005 | Neuwirth | |
| 2006/0158308 A1 | 7/2006 | McMullen et al. | |
| 2008/0122626 A1 | 5/2008 | Ehrman et al. | |
| 2008/0218335 A1* | 9/2008 | Attar | G06Q 10/08 |
| | | | 340/539.13 |
| 2010/0188194 A1 | 7/2010 | Shiau et al. | |
| 2011/0054731 A1* | 3/2011 | DeRose | G06Q 10/08 |
| | | | 701/31.4 |
| 2012/0077468 A1* | 3/2012 | Fan | G07C 9/00309 |
| | | | 455/414.1 |
| 2014/0035726 A1 | 2/2014 | Schoner et al. | |
| 2014/0125502 A1 | 5/2014 | Wittkop et al. | |
| 2014/0253286 A1 | 9/2014 | Bianco et al. | |
| 2017/0011423 A1* | 1/2017 | Douglas | H04W 4/029 |
| 2017/0215034 A1* | 7/2017 | Blowers | H04W 4/021 |
| 2018/0184255 A1* | 6/2018 | Marson | H04W 4/029 |

OTHER PUBLICATIONS

Dunbar, G. "Downington to continue using 'SafeStop' app," Dailylocal. com, 1-2 (Jan. 23, 2016).
"Northstar Child Safety Platform," http://northstar.global/product/, 1-3, Accessed on Feb. 27, 2018.
"SafeStop—Your School Buss Tracking App," http://www.safestopapp.com/, 1-2, Accessed on Feb. 27, 2018.
"SkoolSmart Child Safety First," http://web.archive.org/web/20180221235126/http://www.skoolsmart.net/skoolsmart.html, 1-6, Access on Feb. 21, 2018.
"Student Tracking & Security Solutions," http://www.swipek12.com/Swipek12/, 1, Accessed on Feb. 27, 2018.

* cited by examiner

SYSTEM AND METHOD FOR TRACKING LOCATIONS OF STUDENTS WITHIN SCHOOL BUILDINGS

RELATED APPLICATIONS

This application is related to U.S. application Ser. No. 16/112,014 filed on Aug. 24, 2018, entitled "System and method for tracking students," now U.S. Patent Publication No.: 2020/0066129, which is incorporated herein by reference in its entirety.

BACKGROUND OF THE INVENTION

Student tracking systems are often used to track the location of students of schools, such as public or private kindergartens, elementary schools, middle schools, and high schools. These systems range from mobile applications that track the location of mobile computing devices (e.g. smart phones) or other tracking devices of the students to more advanced systems that also track the location of school buses transporting the students to and from school, the location of the students while at school, and provide image data depicting the students at the schools or on the school buses. Typically, student tracking systems use global navigation satellite systems (GNSS) such as the global positioning system (GPS). GNSS receivers of the mobile computing devices or tracking devices receive positioning signals from GNSS satellites, which are then used to generate location information for the students or buses. The student tracking systems then use the location information to determine if the students boarded the buses and whether they arrived at school.

At the same time, building management systems such as intrusion systems are often installed within school buildings. Intrusion systems typically include intrusion control panels and intrusion distributed devices. The distributed devices detect indications of intrusions, building security breaches and unauthorized access at or within the building and report to the intrusion panels. Security distributed devices include sensors such as motion sensors, door and window relays, thermal sensors, and surveillance cameras that communicate with the intrusion panel over a security network. Motion sensor devices can detect intrusions and unauthorized access to the premises, and send indications of the intrusions to the security panel. The surveillance camera devices capture video data of monitored areas within the premises, in examples.

SUMMARY OF THE INVENTION

In general, there is a need for a student tracking system with more precise tracking of students' locations within a school building and notification capabilities for notifying parents, faculty, school administrators, security personnel, law enforcement and/or first responders of the students' exact locations. Such a system would generally employ sensors for discerning where students and other users are within the school building at any moment.

A student tracking system according to the present invention deploys distributed sensors in the ceiling of every area in a school building. These distributed sensors can detect signals transmitted by user devices (e.g. mobile computing devices or beacons) carried by occupants of the school such as students, teachers and school administrators. As occupants enter the school building their user device is detected and that person is registered as present in the building. Then the system can track the location of that person regardless of where in the building that they travel. When an emergency situation arises, the student tracking system sends location information for the occupants to tracking devices (e.g. computing devices operating mobile applications) operated by tracking device users such as school administrators and emergency responders, so that they know exactly where every occupant is in the building. The system also allows parents to operate the tracking devices to track where their children are in the school and correlate the location of the child to cameras located in the building. For example, the location of a child at pick up time could allow parents to watch their children board the school bus or watch as they are picked up by a relative or caregiver.

In general, according to one aspect, the invention features a system for tracking locations of students inside of a school, the system comprising distributed sensors, a tracking and authorization module, and an app server. The distributed sensors comprise wireless receivers for receiving broadcast identification information from user devices of the students. The tracking and authorization module generates location information for the students based on the identification information received by the distributed sensors. The app server presents the location information to parents of the students via computing devices of the parents having one or more displays.

In embodiments, the location information for the students is based on stored location information for the distributed sensors. The app server presents image data captured by surveillance cameras of the school to the parents based on the location information of the students. The computing devices of the parents present the location information via graphical user interfaces rendered on the one or more displays. The user devices of the students include mobile computing devices, identification badges, and/or wearable beacons. The distributed sensors also receive broadcast identification information from user devices associated with faculty, administrators and/or guests of the school, and the tracking and authorization module generates location information for the faculty, administrators and/or guests of the school. In addition, the tracking and authorization module generates alerts in response to receiving identification information for unknown user devices. The distributed sensors also comprise motion and/or proximity detectors for detecting the presence of individuals in the vicinity of the distribute sensors, and the tracking and authorization module generates alerts in response to receiving indications that the distributed sensors detected the presence of individuals but did not receive broadcast identification information. The wireless receivers of the distributed sensors include Bluetooth receivers and/or radio-frequency identification readers. Finally, the app server further presents the location information for the students to first responders during emergency events.

In general, according to another aspect, the invention features a method for tracking locations of students inside of a school. Distributed sensors receive broadcast identification information from user devices of the students. Location information is generated for the students based on the identification information received by the distributed sensors, and the location information is presented to parents of the students via computing devices of the parents having one or more displays.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
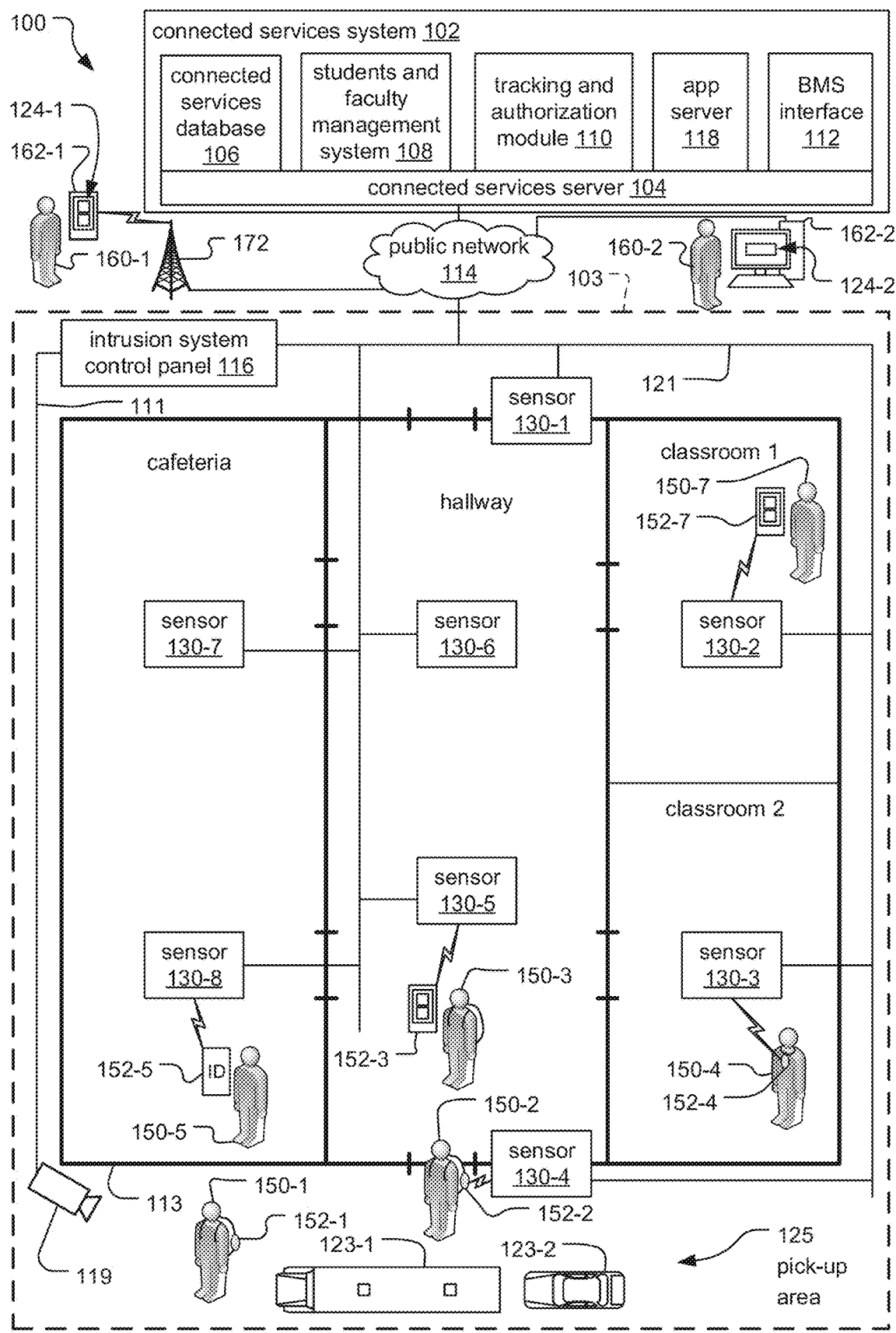
FIG. 1 is a schematic diagram of an exemplary student tracking system according to one embodiment of the present invention.

FIG. 1 is a schematic diagram of an exemplary student tracking system 100 according to one embodiment of the present invention.

The student tracking system 100 tracks occupants 150 of a school premises 103 of a school such as public or private kindergartens, elementary schools, middle schools, and/or high schools. The school premises includes one or more school buildings 113 along with outdoor areas such as parking lots, fields, walkways and pick-up areas 125, which are designated outdoor areas, often close to entrances/exits of the school buildings 113 where the students of the schools board pick-up vehicles 123 such as buses 123-1 or cars 123-2 conducted by bus drivers, parents, and/or other individuals associated with the schools or the students.

Occupants 150 of the school premises 103 are individuals who might be located anywhere on the school premises 103 and/or in the school building 113 during a normal course of business, including students, faculty, school administrators, and guests. The occupants 150 carry wireless-enabled user devices 152, which wirelessly communicate with other devices using, for example, Bluetooth technology protocols such as Bluetooth Low Energy (BLE). During normal operation, the user devices 152 wirelessly broadcast identification (ID) information such as serial numbers, media access control (MAC) addresses and/or universally unique identifiers (UUID) in order to facilitate establishing personal area networks (PAN) with the other devices. The user devices 152 can include mobile computing devices 152-3, 152-6, 152-7 such as laptop computers, tablet computers, phablet computers (i.e., a mobile device that is typically larger than a smart phone, but smaller than a tablet), smart watches, to list a few examples. The user devices 152 can also include ID badges 152-5, which are cards or tags that transmit identification information associated with the occupants 150. The user devices 152 might also include beacon devices 152-1, 152-2, 152-4, which can be worn by the occupants 150 (e.g. around the neck) or attached to clothing or backpacks of the occupants 150, among other examples.

On the other hand, tracking users 160 are individuals to whom location information about the occupants 150 is sent, for example, during emergency events. The tracking users 160 can include parents of students, school administrators, school security personnel, or emergency services personnel such as emergency medical technicians, police officers, and fire fighters. In general, tracking users 160 access the location information for the occupants 150 via components of the student tracking system 100 and tracking devices 162 connected to or in communication with the student tracking system 100. In general, these tracking devices 162 can include mobile computing devices or other computing devices with network connectivity to the student tracking system 100.

The student tracking system 100 includes distributed sensors 130, which, in general, detect the presence of individuals in the proximity of the distributed sensors 130. More specifically, the distributed sensors 130 are installed (for example, in the ceiling) in areas throughout the school building 113 and receive the broadcast identification information from the user devices 152 carried and/or operated by the occupants 150 in those areas. The distributed sensors 130 send the identification information to a connected services system 102 of the student tracking system 100, which, at a high level, generates location information for the occupants 150 based on the identification information and sends the location information to the tracking devices 162. The tracking devices 162 present the location information to the tracking users 160 via graphical user interfaces 124 rendered on displays of the tracking devices 162, for example, by mobile applications executing on the devices.

In general, the school building 113 might have one or more building management systems such as an intrusion system. The intrusion system includes an intrusion control panel 116 and intrusion distributed devices. The intrusion control panel 116 directs the functionality of the intrusion system by receiving signals and/or data (for example, from the intrusion distributed devices), sending instructions, and determining and sending status information or sensor data, among other examples, to be displayed on or utilized by the distributed devices. The intrusion system detects indications of intrusions, building security breaches and unauthorized access at or within the school building 113 and alerts managers and/or occupants 150 of the school building 113. The intrusion distributed devices include, for example, a surveillance camera 119. The surveillance camera 119 captures image data depicting areas of the school building 113, which is monitored, stored, and/or analyzed, for example, via video analytics and facial recognition processes. Other distributed intrusion devices (not illustrated) include motion detectors, door and window relays, network video recorders, among other examples.

The intrusion devices communicate with the intrusion control panel 116 via a safety and security network 111 of the school building 113. The safety and security network 111 supports digital and/or analog communication between the intrusion distributed devices and the control panel 116.

Additionally, the school building 113 includes a school data network 121, which is a wired and/or wireless network connecting computing devices on the school premises 103, including the distributed sensors 130, intrusion control panel 116 and possibly the user devices 152 and tracking devices 162. The intrusion control panel 116 and distributed sensors 130 communicate with the connected services system 102 via the school data network 121 and a public network 114 such as the internet. The tracking devices 162 also connect to the public network 114 via wireless communication links to a cellular radio tower 172 of a mobile broadband or cellular network or public and/or private wired data networks such as an enterprise network, Wi-Max, or Wi-Fi network, for example. Additionally, the intrusion distributed devices such as the surveillance camera 119 might communicate with the connected services system 102 via the control panel 116 or more directly via the school data network 121 and the public network 114.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes modules and applications, including a tracking and authorization module 110 and an app server 118. Each of these modules is associated with separate tasks. In some cases, these modules are discrete modules or they are combined with other modules into a unified code base. They can be running on the same server or different servers, virtualized server system, or a distributed computing system.

The connected services system 102 includes a connected services database 106 and a student/faculty management system 108. The connected services database 106 maintains information about the school premises 103 including student tracking system 100 and building management system device information such as locations of distributed sensors and stored image data captured by the surveillance camera 119, among other examples. The student/faculty management system 108 includes user information (e.g. student and faculty information), including biographic and contact information, user device information, status information, and event information.

The tracking and authorization module 110 generates status and event information for the occupants 150 based on identification information received by the distributed sensors 130, location information for the distributed sensors 130 and signal strength information and sends the location information and other alerts and/or notifications to the tracking devices 162. The tracking and authorization module 110 also determines whether unauthorized individuals are inside the school building 113 based on the identification information from the distributed sensors 130 (or an indication that no identification was received from an individual detected by the sensors). The event information for the occupants 150 pertains to the occupants' 150 movements within the school building 103 and can include time and date information, the location (e.g. which classroom), and whether the occupant 150 has entered and/or exited the school building 113 or has left the school premises 103, for example, after being picked up in a pick-up vehicle 123.

The app server 118 communicates with the tracking devices 162, for example, by sending the location information and any other relevant information to the tracking devices 162 to be displayed (e.g. via the graphical user interface 124).

The connected services system 102 also includes a building management system interface 112. The building management system interface 112 operates as the interface between the tracking and authorization module 110 and app server 118, and devices of building management systems controlling the school premises 103 such as the intrusion control panel 116 and the surveillance camera 119. In particular, the building management system interface 112 converts instructions from the authorization and tracking module 110 and/or the app server 118 into instructions that are formatted into the protocol implemented by the building management system. Additionally, the building management system interface 112 receives information from the building management systems and converts the information into a uniform format that can be consumed by the authorization and tracking module 110 and/or the app server 118, regardless of the underlying protocol implemented by the building management systems. In one example, the surveillance camera 119 of the intrusion system installed on the school premises 103 captures image data depicting students being picked up in pick-up vehicles 123 at the pick-up area 125 and sends the image data to the tracking and authorization module 110 and/or the app server 118 via the building management system interface 112.

In the illustrated example, the school premises 103 includes a school building 113 with eight distributed sensors 130. The distributed sensor 130-4 is stationed at an entrance/ exit to the school building 113 closest to the pick-up area 125, while the distributed sensor 130-1 is stationed at an entrance/exit to the school building 113 on the other side of the building from the pick-up area 125. Inside the school building 113, two distributed sensors 130-5, 130-6 are installed in the ceiling of a hallway area, two distributed sensors 130-7, 130-8 are installed in the ceiling of a cafeteria area, one distributed sensor 130-2 is installed in the ceiling of a classroom area "classroom 1," and one distributed sensor 130-3 is installed in the ceiling of a classroom area "classroom 2."

In classroom 1, the user device 152-7 carried and/or operated by, for example, a faculty member 150-7 broadcasts identification information associated with the faculty member 150-7, which is received by the nearby distributed sensor 130-2. Similarly, in classroom 2, the user device 152-4 worn around the neck of, for example, a guest 150-4 of the school (e.g. as a guest badge) broadcasts identification information associated with a generic guest profile, or possibly the guest 150-4, which is received by the nearby distributed sensor 130-3. In the hallway, the user device 152-3 carried and/or operated by a student 150-3 broadcasts identification information associated with the student 150-3 to the nearby distributed sensor 130-5. In the cafeteria, the user device 152-5 carried by, for example, a school administrator 150-5 (e.g. as an identification badge) broadcasts identification information associated with the school administrator 150-5 to the nearby distributed sensor 130-8.

Outside the school building 113, a bus 123-1 and a pick-up vehicle 123-2 wait at the pick-up area 125 to pick up students. The user device 152-2 attached to the backpack of a student 150-2 broadcasts identification information associated with the student 150-2 to the nearby distributed sensor 130-4 stationed at the entrance/exit near the pick-up area 125 as the student exits the school building 113. The surveillance camera 119 captures image data depicting another student 150-1 waiting in the pick-up area 125.

Figure 2:
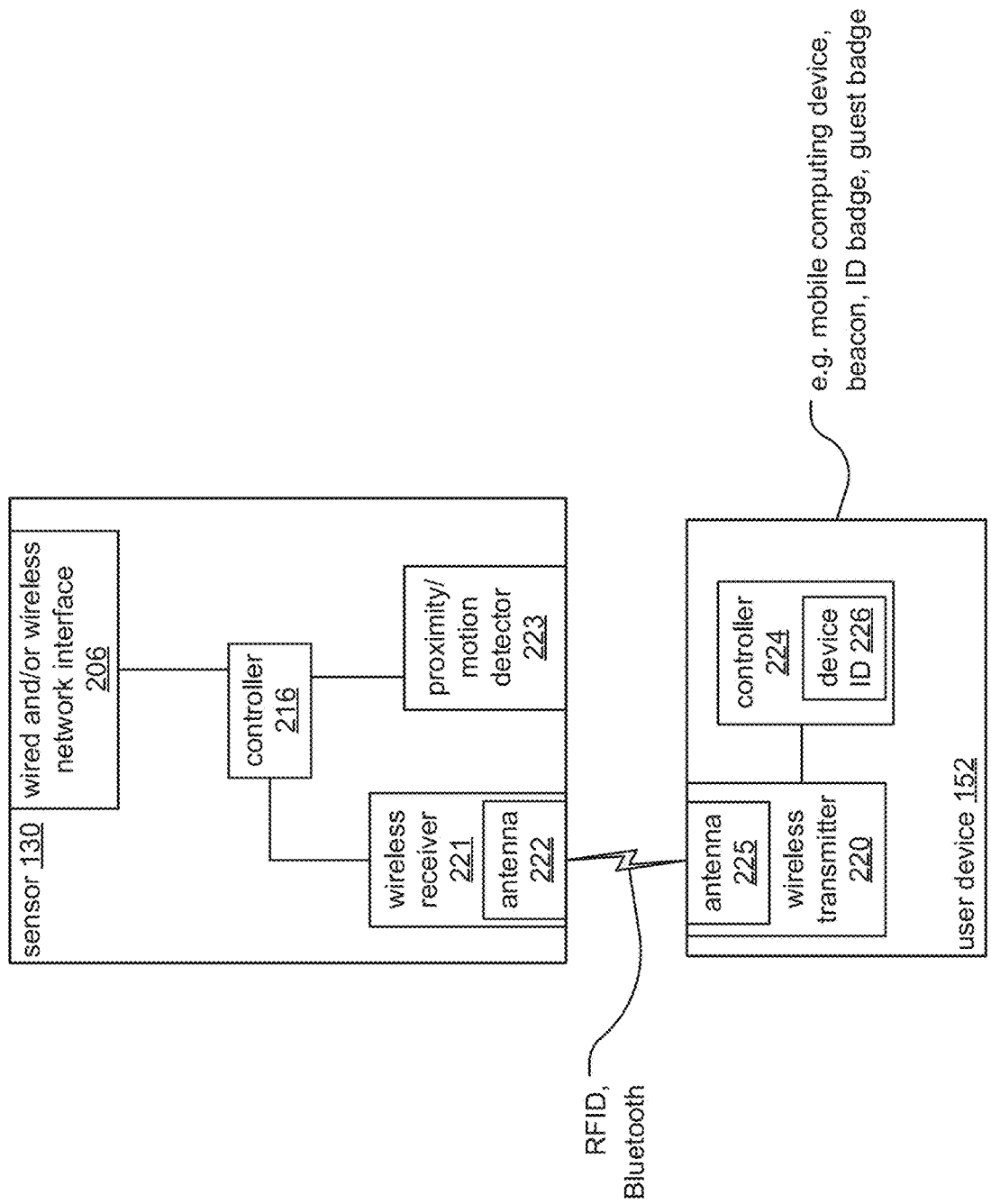
FIG. 2 is a schematic diagram showing an exemplary distributed sensor and user device of the student tracking system.

FIG. 2 is a schematic diagram showing an exemplary distributed sensor 130 and user device 152.

The user device 152, which might be a mobile computing device, beacon device, or identification badge, includes a controller 224, a wireless transmitter 220 and an antenna 225. The controller 224 executes firmware/operating system instructions and generally directs the functionality of the user device 152 in addition to storing a device ID 226 uniquely associated with the user device 152, for example, via integrated memory of the controller 224 or nonvolatile memory (not illustrated). The wireless transmitter 220 transmits via the antenna 225 the identification information (e.g. device ID 226), for example, by wirelessly broadcasting the identification information on a continual basis. The user device 152 may have other components that are not illustrated, such as in the example of the mobile computing device.

The distributed sensor 130 includes a controller 216, a wired and/or wireless network interface 206, a wireless receiver 221 and antenna 222, and a proximity/motion detector 223. The controller 216 executes firmware/operating system instructions and generally directs the functionality of the distributed sensor 130. The wired and/or wireless network interface 206 provides connectivity with the connected services system 102 via the public network 114 and/or the school network 121. The wireless receiver 221 receives the identification information from the user device 152 via the antenna 222. The proximity/motion detector 223 detects movement or the presence of individuals near the distributed sensor 130.

Figure 3:
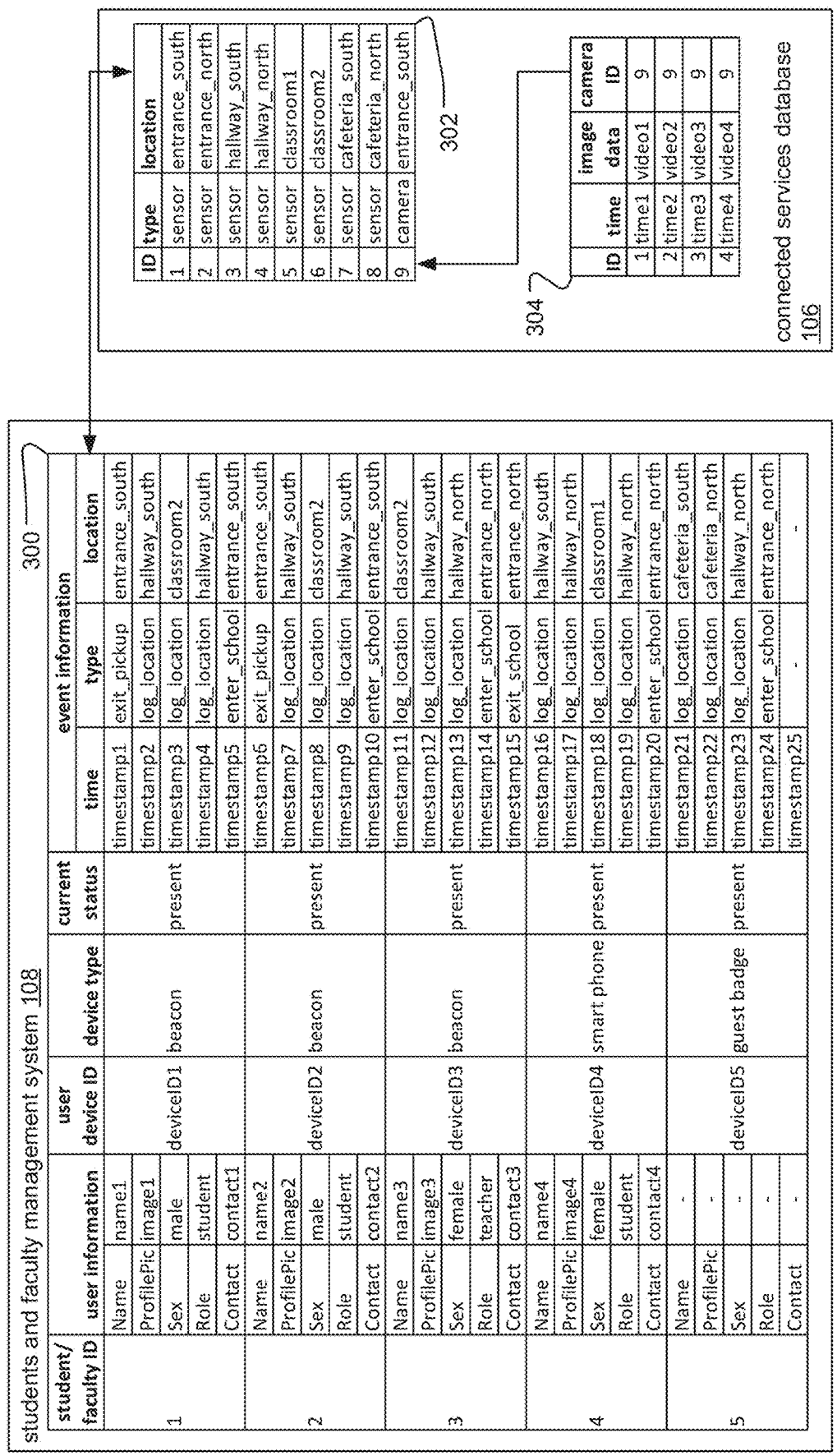
FIG. 3 is a diagram showing an exemplary connected services database and student/faculty management system of the student tracking system.

In different implementations, the user device 152 and the distributed sensor 130 can communicate using various wireless technologies including Bluetooth Low Energy (BLE), standard Bluetooth, Wi-Fi (IEEE 802.11), active RFID, or ZigBee, to list a few examples FIG. 3 is a diagram showing an exemplary connected services database 106 and student/faculty management system 108.

The connected services database 106 includes a device table 302 and an image data table 304.

The device table 302, which maintains information about the distributed sensors 130 and other devices interacting with the student tracking system 100 such as the surveillance camera 119, includes columns for a device ID, or unique identifier assigned to the distributed sensor 130 or surveillance camera 119, device type indicating whether it is a sensor or a camera, and location. The location includes location information indicating where on the school premises 103 the devices are installed. The location information might include a value representing a location known by the student tracking system 100, coordinate information (e.g. with respect to an indoor mapping system) or references to known locations such as rooms of the school building 113, among other examples.

In the illustrated example, the device table 302 lists nine different devices with device IDs ranging from 1 through 9, each associated with a type such as "sensor" or "camera" and a location such as e.g. "entrance_south", "entrance_north", "hallway_south", "hallway_north", "classroom_1", "classroom_2, "cafeteria_south" and "cafeteria_north". For example, the first device listed in the device table 302 is a distributed sensor 130 which is located at the southern entrance to the school building 113.

The image data table 304, which maintains stores image data and metadata captured and generated by the surveillance camera 119, includes columns for an ID, or unique identifier assigned to the discrete portion of image data, a time, a reference to the image data (e.g. to a file containing the data), and camera ID. The time column includes time and date information (e.g. timestamp) for when the image data was captured by the surveillance camera 119. The camera ID column indicates which surveillance camera 119 captured the image data and refers to values from the device ID column of the device table 302.

In the illustrated example, the image data table 304 lists four different discrete portions of image data (e.g. image data files) with IDs ranging from 1 through 4, each associated with a different timestamp ranging from time1 through time4, image data values ranging from video1 through video4, and a camera ID of 9, indicating that the surveillance camera 119 with the ID of "9" captured the image data for all of the image data in the image data table 304.

The student/faculty management system 108 includes a student/faculty table 300, which maintains information associated with different occupants (specifically, students, faculty, and school administrators). The student table 300 includes columns for student/faculty ID, or unique identifiers for each student or faculty member, user information, user device ID, device type, current status, and event information. The user information includes basic information about the occupant 150 including name, a profile picture, sex, role (e.g. student, or teacher), and contact information. The user device ID column includes identification information for any user devices 152 associated with the occupant 150. The device type column includes information about the type of device identified in the student device ID column, such as whether the device is a beacon, smart phone or guest badge, among other examples. The current status column indicates real-time status information for the occupant 150 such as whether the occupant 150 is present in the school building 113. The event information column includes the event information for The event information column includes the information about instances when the user device 152 associated with the occupant 150 was detected by the distributed sensors 130, including time and date information, a type or descriptor of the event indicating, for example, whether the occupant's 150 location within the school building 113 was logged, or whether the occupant 150 entered or exited the school building 113, and location information indicating the location of the event with reference to the values from the location column of the device table 302.

In the illustrated example, the student/faculty table 300 lists four occupants 150 with different names, profile pictures, sexes, roles, and contact information along with a blank guest profile associated with a guest badge. Each of the occupants 150 is associated with a different user device ID for a user devices 152 ranging from deviceID1 through deviceID5, a type of either "beacon", "smart phone" or "guest badge", and a current status of "present" (indicating all of the occupants 150 listed are present within the school building 113). Similarly, each of the occupants 150 has an associated event information history, with timestamps ranging from time1 through time25 associated with event descriptors such as e.g. "exit_pickup", "log_location", "enter_school", and locations such as e.g. "entrance_south", "hallway_south", and "classroom2".

Figure 4:
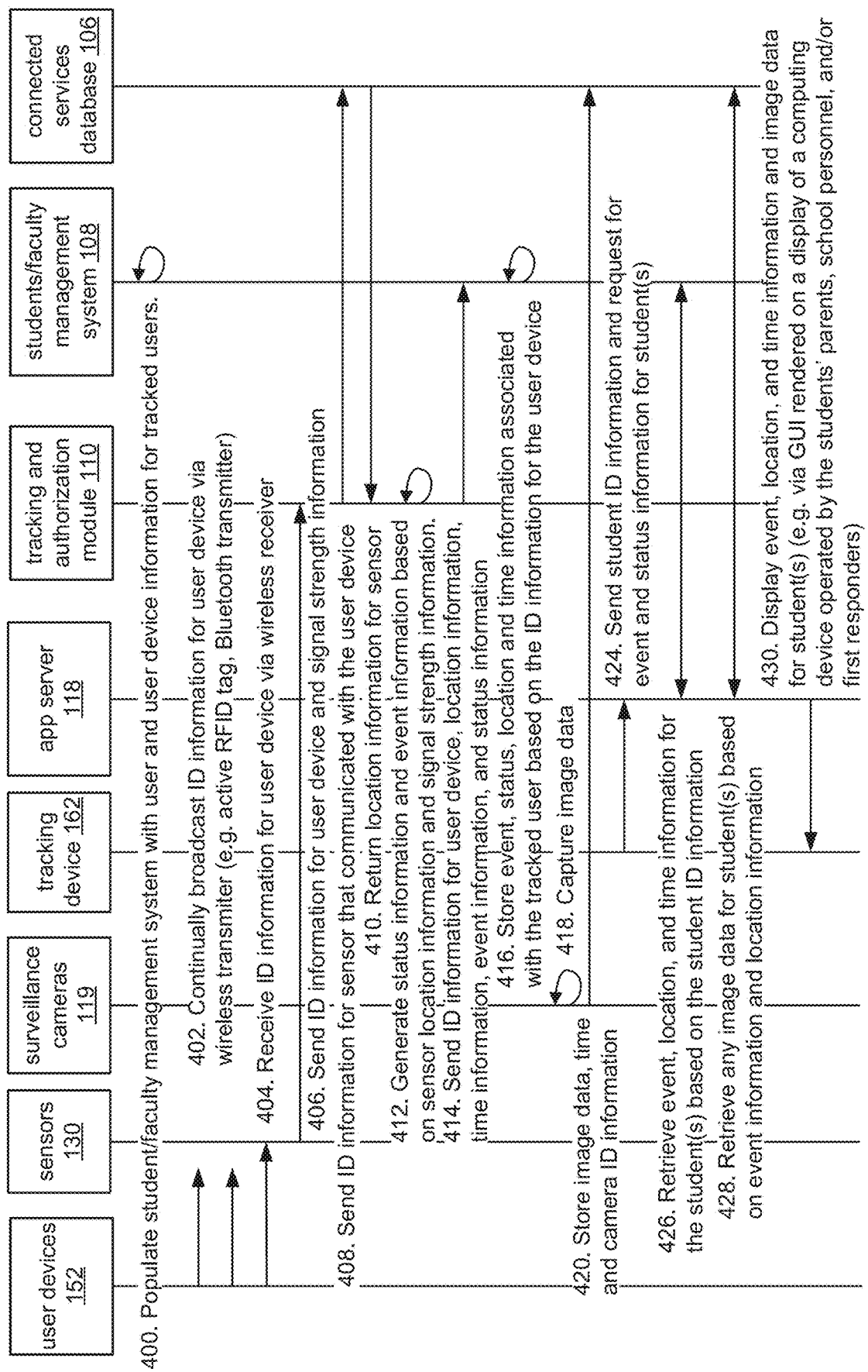
FIG. 4 is a sequence diagram illustrating an example of how the student tracking system tracks locations of occupants of a school building.

FIG. 4 is a sequence diagram illustrating an example of how the student tracking system 100 tracks the location of the occupants 150 of the school building 113.

First, in step 400, the student/faculty management system 108 is populated with occupant and user device information for occupants 150 of the building 113 to be tracked.

In step 402, the user devices 152 carried, worn, and/or operated by the occupants 150 of the school building 113 continually broadcast identification information for the user devices 152 via the wireless transmitter 220.

In step 404, the distributed sensors 130 receive the identification information from nearby user devices 152 via the wireless receiver 221, and, in step 406, the distributed sensors 130 send the identification information for the user devices 152 along with their own identification information and signal strength information for the wireless signals transmitted from the user devices 152 to the distributed sensors 130 to the tracking and authorization module 110.

In step 408, the tracking and authorization module 110 sends the identification information for the distributed sensors 130 to the connected services database 106, which, in step 410 returns the location information associated with the distributed sensors 130 based on the identification information.

In step 412, the tracking and authorization module 110 generates status information and event information for the user devices 152 detected by the distributed sensors 130 based on the sensor location information and the signal strength information. In one example, tracking and authorization module 110 determines that the user device 152 is at the south entrance of the school building 113 and, based on the signal strength information, determines that the user device 152 is moving away from the building 113 and thus that the occupant 150 carrying the user device 152 is exiting the building 113.

In step 414, the tracking and authorization module 110 sends the identification information for the user device 152, location information, time information, event information, and status information to the student/faculty management system 108, which, in step 416, associates the information with particular occupants 150 based on the identification information for the user device 152, and stores the location information, time information, event information and status information for those occupants 152.

In step 418, the surveillance camera 119 captures image data, and, in step 420 sends the image data to be stored in the connected services database 106, for example, in the image data table 304.

In step 424, a tracking device 162 (e.g. a mobile computing device) operated by a tracking user 160 such as a parent of a student, sends to the app server 118 the identification information for an occupant 150 (e.g. a student) along with a request for the event and status information associated with the student.

In step 426, the app server 118, retrieves the event, location, and time information for the occupant 150 from the student/faculty management system 108 based on the identification information for the occupant 150 provided by the tracking device 162. In step 428, the app server 118 also retrieves image data depicting the occupant 150 from the connected services database 106 based on the event information and location information. For example, the app server 118 retrieves the image data captured in the same area of the school building 113 and at the same time that the user device 152 of the occupant 150 was detected.

In step 430, the app server 118 presents the event, location and time information along with the image data for the occupant 150 (e.g. via the graphical user interface 124 rendered on the display of the tracking device 162).

Figure 5:
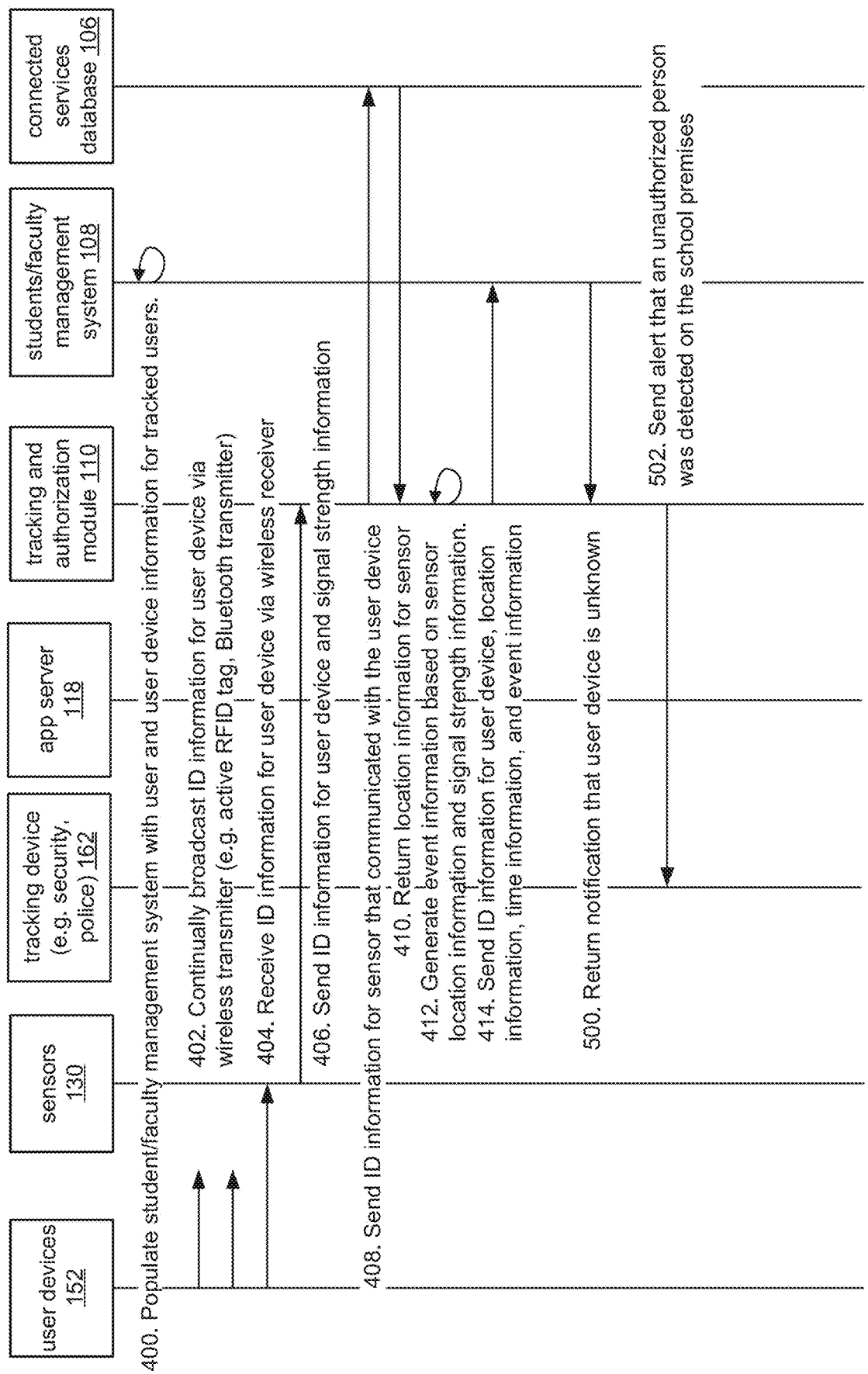
FIG. 5 is a sequence diagram illustrating an example of how the student tracking system detects unauthorized individuals within the school building according to one embodiment in which identification information received by the distributed sensors is not recognized.

FIG. 5 is a sequence diagram illustrating an example of how the student tracking system 100 detects unauthorized individuals within the school building 113 according to one embodiment of the present invention.

Steps 400 through 414 proceed as previously described, as the tracking and authorization module 110 sends the event information to the student/faculty management system 108 to be stored based on identification information for the user device 152 as received by the distributed sensors 130.

Now, however, in step 500, the student/faculty management system 108 returns an indication that the user device 152 is unknown to the system, for example, because the identification information is not stored in the student/faculty management system 108 associated with any known occupant 150.

As a result, in step 502, the tracking and authorization module 110 sends an alert to the tracking device 162 operated, for example, by a security guard or school administrator, indicating that an unauthorized person was detected in the school building 113 and providing the location information.

Figure 6:
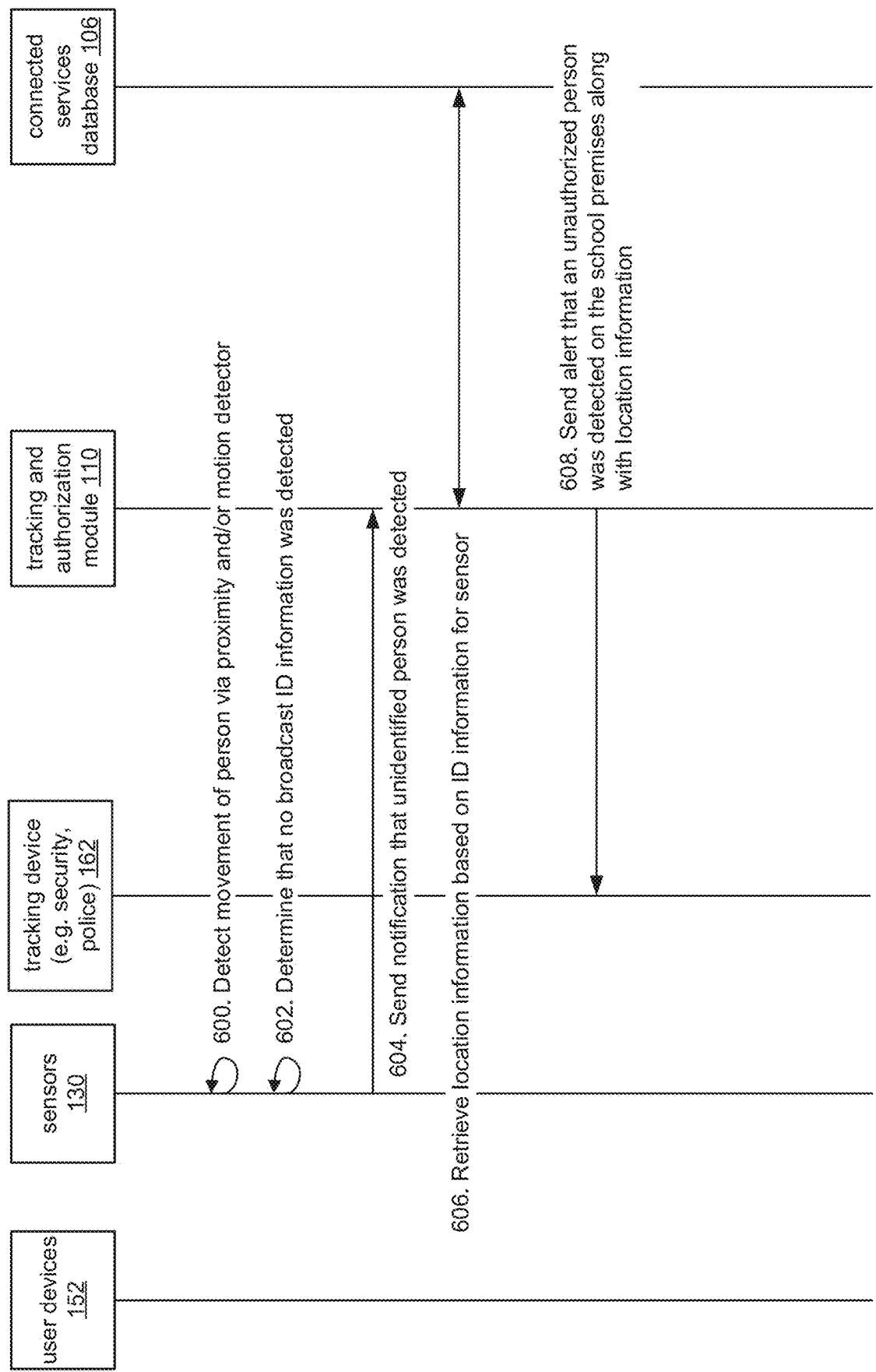
FIG. 6 is a sequence diagram illustrating an example of how the student tracking system detects unauthorized individuals according to another embodiment in which no identification information corresponding to individuals detected via motion sensors is received by the distributed sensors.

FIG. 6 is a sequence diagram illustrating an example of how the student tracking system 100 detects unauthorized individuals within the school building 113 according to another embodiment of the present invention.

In step 600, the distributed sensors 130 detect movement of an individual via the proximity and/or motion detector 223. In step 602, the distributed sensor 130 further determines that no broadcast identification information was received from any nearby user devices 152. This step could also be performed by the tracking and authorization module 110.

As a result, in step 604, the distributed sensor 130 notifies the tracking and authorization module 110 that the unauthorized individual was detected along with identification information for the sensor. In step 606, the tracking and authorization module 110 retrieves from the connected services database 106 the location information for the sensor based on the sensor's identification information.

Finally, in step 608, the tracking and authorization module 110 sends an alert to the tracking device 162 operated, for example, by a security guard or school administrator, indicating that the unauthorized individual was detected, along with the location information.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for tracking locations of students inside of a school, the system comprising:
   distributed sensors installed in each area throughout a building of the school, the distributed sensors comprising wireless receivers for receiving broadcast identification information from user devices of students within the areas of the school where the distributed sensors are installed;
   a tracking and authorization module executing on a computer system, the tracking and authorization module generating location information for the students based on the identification information received by the distributed sensors and based on stored location information indicating where in the school the distributed sensors are installed; and
   an app server for presenting the location information to parents of the students via computing devices of the parents having one or more displays,
   wherein locations of the students are correlated with surveillance cameras of an intrusion system located in the building, and the app server retrieves image data captured by the surveillance cameras in same areas of the building and at a same time that the user devices of the students were detected and presents the image data captured by the surveillance cameras based on the location information of the students.

2. The system as claimed in claim 1, wherein the location information for the students is based on stored location information for the distributed sensors.

3. The system as claimed in claim 1, wherein the computing devices of the parents present the location information via graphical user interfaces rendered on the one or more displays.

4. The system as claimed in claim 1, wherein the user devices include mobile computing devices, identification badges, and/or wearable beacons.

5. The system as claimed in claim 1, wherein the distributed sensors receive broadcast identification information from user devices associated with faculty, administrators and/or guests of the school, and the tracking and authorization module generates location information for the faculty, administrators and/or guests of the school.

6. The system as claimed in claim 1, wherein the tracking and authorization module generates alerts in response to receiving identification information for unknown user devices.

7. The system as claimed in claim 6, wherein:
   the distributed sensors receive broadcast identification information from an unknown user device;
   the tracking and authorization module generates location information for the unknown user device and sends an alert to security guards and/or administrators of the school indicating that an unauthorized person was detected in the school in response to determining that the identification information from the unknown user device is not associated with any known occupants of the school.

8. The system as claimed in claim 1, wherein the distributed sensors comprise motion and/or proximity detectors for detecting a presence of individuals in a vicinity of the distributed sensors, and the tracking and authorization module generates alerts in response to receiving indications that the distributed sensors detected the presence of individuals but did not receive broadcast identification information.

9. The system as claimed in claim 1, wherein the wireless receivers of the distributed sensors include Bluetooth receivers and/or radio-frequency identification readers.

10. The system as claimed in claim 1, wherein, during emergency events, the app server further presents location information indicating where the students are each located within the school to first responders via computing devices of the first responders having one or more displays.

11. The system as claimed in claim 1, wherein:
   the tracking and authorization module generates and stores event information for events, which are instances when the user devices were detected via the distributed sensors, the event information including time information and location information for the events;
   the app server retrieves previously stored image data depicting the students during the events based on the stored event information, location information for the surveillance cameras, and time and date information for the previously stored image data; and
   the app server presents the retrieved image data to the parents.

12. The system as claimed in claim 11, wherein the tracking and authorization module determines whether the events correspond to students exiting the building based on the event information and signal strength for wireless signals transmitted from the user devices to the distributed sensors.

13. The system as claimed in claim 12, wherein distributed sensors stationed at an exit of the school near a pick-up area receive broadcast identification information from the user devices of students exiting the school.

14. The system as claimed in claim 13, wherein the surveillance cameras capture image data depicting students waiting and/or being picked up in pick-up vehicles at the pick-up area.

15. The system as claimed in claim 14, wherein the app server retrieves and presents the image data captured by the surveillance cameras at the pick-up area at the same time that the distributed sensors stationed near the pick-up area detected the user devices of the students exiting the school.

16. The system as claimed in claim 1, wherein the intrusion system detects indications of intrusions, building security breaches and/or unauthorized access of the school and alerts managers and/or occupants of the school, and the intrusion system includes a control panel which directs functionality of the intrusion system by receiving signals and/or data from distributed devices of the intrusion system and sending instructions and information to be displayed on or utilized by the distributed devices of the intrusion system, the distributed devices of the intrusion system including the surveillance cameras.

17. The system as claimed in claim 16, further comprising a building management system interface for providing an interface between the tracking and authorization module and app server and the control panel and/or surveillance cameras of the intrusion system.

18. The system as claimed in claim 17, wherein the surveillance cameras of the intrusion system sends the image data to the tracking and authorization module and/or the app server via the building management system interface.

19. The system as claimed in claim 1, wherein the distributed sensors are installed in ceilings of the areas throughout the school building.

20. The system as claimed in claim 1, wherein the stored location information indicating where in the school the distributed sensors are installed include values representing known locations including coordinate information or references to known locations of the school building.

21. A method for tracking locations of students inside of a school, the method comprising:
   distributed sensors installed in each area throughout a building of the school receiving broadcast identification information from user devices of students within areas of the school where the distributed sensors are installed;
   generating location information for the students based on the identification information received by the distributed sensors and based on stored location information indicating where in the school the distributed sensors are installed;
   presenting the location information to parents of the students via computing devices of the parents having one or more displays; and
   correlating locations of the students with surveillance cameras of an intrusion system located in the building, retrieving image data captured by the surveillance cameras in same areas of the building and at a same time that the user devices of the students were detected, and presenting the image data captured by the surveillance cameras to the parents based on the location information of the students.

22. The method as claimed in claim 21, further comprising generating the location information for the students based on stored location information for the distributed sensors.

23. The method as claimed in claim 21, further comprising the computing devices of the parents presenting the location information via graphical user interfaces rendered on the one or more displays.

24. The method as claimed in claim 21, wherein the user devices include mobile computing devices, identification badges, and/or wearable beacons.

25. The method as claimed in claim 21, further comprising the distributed sensors receiving broadcast identification information from user devices associated with faculty, administrators and/or guests of the school and generating location information for the faculty, administrators and/or guests of the school.

26. The method as claimed in claim 21, further comprising generating alerts in response to receiving identification information for unknown user devices.

27. The method as claimed in claim 21, further comprising generating alerts in response to receiving indications that the distributed sensors detected a presence of individuals but did not receive corresponding broadcast identification information associated with the detected individuals.

28. The method as claimed in claim 21, wherein the wireless receivers of the distributed sensors include Bluetooth receivers and/or radio-frequency identification readers.

29. The method as claimed in claim 21, further comprising, during emergency events, presenting location information indicating where the students are each located within the school to first responders via computing devices of the first responders having one or more displays.

30. A system for tracking locations of students inside of a school, the system comprising:
   distributed sensors installed in each area throughout a building of the school, the distributed sensors comprising wireless receivers for receiving broadcast identification information from user devices of students within the areas of the school where the distributed sensors are installed;
   a tracking and authorization module executing on a computer system, the tracking and authorization module generating location information for the students based on the identification information received by the distributed sensors and based on stored location information indicating where in the school the distributed sensors are installed, wherein the location information for the students is based on stored location information for the distributed sensors, and the tracking and authorization module generates alerts in response to receiving identification information for unknown user devices; and
   an app server for presenting the location information to parents of the students via computing devices of the parents having one or more displays,
   wherein locations of the students are correlated with surveillance cameras of an intrusion system located in the building, and the app server retrieves image data captured by the surveillance cameras in same areas of the building and at a same time that the user devices of the students were detected and presents the image data captured by the surveillance cameras based on the location information of the students, and, during emergency events, the app server further presents location information indicating where the students are each located within the school to first responders via computing devices of the first responders having one or more displays.

* * * * *